(12) United States Patent
Gozawa et al.

(10) Patent No.: US 11,695,258 B2
(45) Date of Patent: Jul. 4, 2023

(54) SPARK PLUG

(71) Applicant: NGK SPARK PLUG CO., LTD., Nagoya (JP)

(72) Inventors: Tatsuya Gozawa, Nagoya (JP); Ritsuka Nakagawa, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 17/790,046

(22) PCT Filed: Aug. 27, 2020

(86) PCT No.: PCT/JP2020/032456
§ 371 (c)(1),
(2) Date: Jun. 29, 2022

(87) PCT Pub. No.: WO2021/161562
PCT Pub. Date: Aug. 19, 2021

(65) Prior Publication Data
US 2023/0106076 A1  Apr. 6, 2023

(30) Foreign Application Priority Data
Feb. 11, 2020 (JP) ................... 2020-021047

(51) Int. Cl.
*H01T 13/54* (2006.01)

(52) U.S. Cl.
CPC .................... *H01T 13/54* (2013.01)

(58) Field of Classification Search
CPC ........................................... H01T 13/54
USPC .......................................... 313/143
See application file for complete search history.

(56) References Cited

U.S. PATENT DOCUMENTS

| | | | |
|---|---|---|---|
| 2002/0149308 A1 | 10/2002 | Suzuki et al. | |
| 2020/0083674 A1* | 3/2020 | Imai | H01T 13/08 |
| 2020/0313402 A1* | 10/2020 | Imai | H01T 13/20 |

FOREIGN PATENT DOCUMENTS

| | | |
|---|---|---|
| JP | 2006-144648 A | 6/2006 |
| JP | 4068381 B2 | 3/2008 |
| JP | 2013-503447 A | 1/2013 |
| JP | 2019-046661 A | 3/2019 |

(Continued)

OTHER PUBLICATIONS

International Search Report for PCT/JP2020/032456 dated Oct. 6, 2020 [PCT/ISA/210].

(Continued)

*Primary Examiner* — Christopher M Raabe
(74) *Attorney, Agent, or Firm* — Sughrue Mion, PLLC

(57) ABSTRACT

This spark plug includes a cap portion covering a center electrode and an end of a ground electrode from a front side. In a cross section including an axial line, where a pitch of an external thread of a metal shell is X (mm), an axial-line-direction distance between a crest of a rear-end ridge of a full thread portion of an external thread and a rear end of a contact portion of an insulator with which the metal shell contacts directly or via another member is A (mm), an axial-line-direction distance between the rear end of the contact portion and a front end of the insulator is B (mm), and an axial-line-direction distance between the rear end of the contact portion and a seating surface of the metal shell is C (mm), $0 < A < 4X$, $B \leq 15$, and $C \leq 3.6$ are satisfied.

4 Claims, 3 Drawing Sheets

(56) References Cited

FOREIGN PATENT DOCUMENTS

JP      2019-139901 A    8/2019
WO      2011/031449 A2   3/2011

OTHER PUBLICATIONS

Office Action for Japanese Patent Application No. 2020-021047 dated Sep. 9, 2021.
Written Opinion for PCT/JP2020/032456 dated Oct. 6, 2020 [PCT/ISA/237].

* cited by examiner

SPARK PLUG

CROSS REFERENCE TO RELATED APPLICATIONS

This application is a National Stage of International Application No. PCT/JP2020/032456 filed Aug. 27, 2020, claiming priority based on Japanese Patent Application No. 2020-021047 filed Feb. 11, 2020.

TECHNICAL FIELD

The present invention relates to a spark plug that provides a sub chamber to a combustion chamber of an engine.

BACKGROUND ART

There is known a spark plug that provides a sub chamber to a combustion chamber of an engine (e.g., Patent Document 1). In this type of spark plug, a combustible air-fuel mixture flows from the combustion chamber into the sub chamber through a through hole of a cap portion forming the sub chamber. The spark plug ignites the combustible air-fuel mixture that has reached a spark gap, and jets gas flow including flame from the through hole into the combustion chamber by an expansion pressure caused by combustion of the combustible air-fuel mixture. By the jet flow of flame, the combustible air-fuel mixture in the combustion chamber is combusted.

PRIOR ART DOCUMENT

Patent Document

Patent Document 1: Japanese Patent Application Laid-Open (kokai) No. 2006-144648

SUMMARY OF THE INVENTION

Problem to be Solved by the Invention

However, in the above conventional technology, pre-ignition might occur in the sub chamber.

The present invention has been made to solve the above problem, and an object of the present invention is to provide a spark plug that can inhibit occurrence of pre-ignition in a sub chamber.

Means for Solving the Problem

To attain the above object, a spark plug of the present invention includes: a cylindrical insulator in which an axial hole extending along an axial line is formed, the insulator having a step portion protruding radially outward on an outer circumference thereof; a center electrode provided in the axial hole; a cylindrical metal shell having a ledge portion protruding radially inward on an inner circumference thereof, an external thread formed on an outer circumference thereof, and a flange portion including a seating surface located on a rear side of the external thread, the metal shell being provided around an outer circumference of the insulator, the ledge portion engaging with the step portion from a front side directly or via another member, so as to form a contact portion where the ledge portion or the other member contacts with the step portion; a ground electrode electrically connected to the metal shell and forming a spark gap between the center electrode and an end of the ground electrode; and a cap portion provided on a front side of the metal shell so as to cover the center electrode and the end of the ground electrode from the front side, the cap portion having a through hole. In a cross section including the axial line, where a pitch of the external thread is X (mm), an axial-line-direction distance between a crest of a rear-end ridge of a full thread portion of the external thread and a rear end of the contact portion is A (mm), an axial-line-direction distance between the rear end of the contact portion and a front end of the insulator is B (mm), and an axial-line-direction distance between the rear end of the contact portion and the seating surface is C (mm), $0<A<4X$, $B\leq15$, and $C\leq3.6$ are satisfied.

Advantageous Effects of the Invention

According to a first aspect, $B\leq15$ mm is satisfied, so that, of the insulator, the surface area of a part located on the front side with respect to the rear end of the contact portion can be made small. Thus, excessive heating of the insulator in the sub chamber can be inhibited. Further, the rear end of the contact portion is located in a range to 4X from the crest of the rear-end ridge of the full thread portion, in which the axial tension of the external thread is great, and $C\leq3.6$ mm is satisfied. Therefore, heat of the insulator is readily released to an engine through the metal shell. Thus, excessive heating of the insulator can be inhibited, whereby occurrence of pre-ignition in the sub chamber can be inhibited.

According to a second aspect, the axial-line-direction distance D between the front end of the sub chamber and the rear end of the contact portion is not less than the distance C. Therefore, temperature increase of the contact portion can be inhibited. Thus, heat of the insulator is further readily released to the engine through the metal shell, so that, in addition to the effect of the first aspect, pre-ignition can be further inhibited.

According to the third aspect, $1.5C\leq D$ is satisfied. Thus, in addition to the effect of the second aspect, pre-ignition can be further inhibited.

According to the fourth aspect, B 12 is satisfied. Thus, in addition to the effect of any of the first to third aspects, pre-ignition can be further inhibited.

MODES FOR CARRYING OUT THE INVENTION

Figure 1:
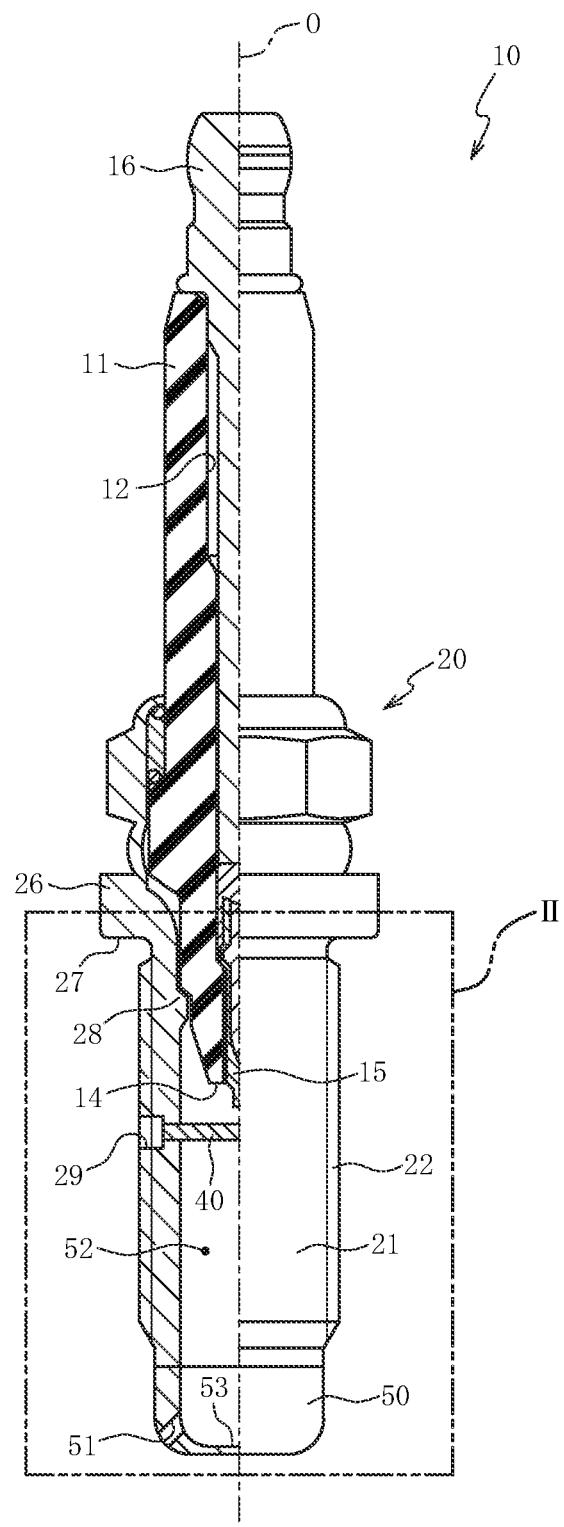
FIG. 1 Half-sectional view of a spark plug according to an embodiment.
Figure 2:
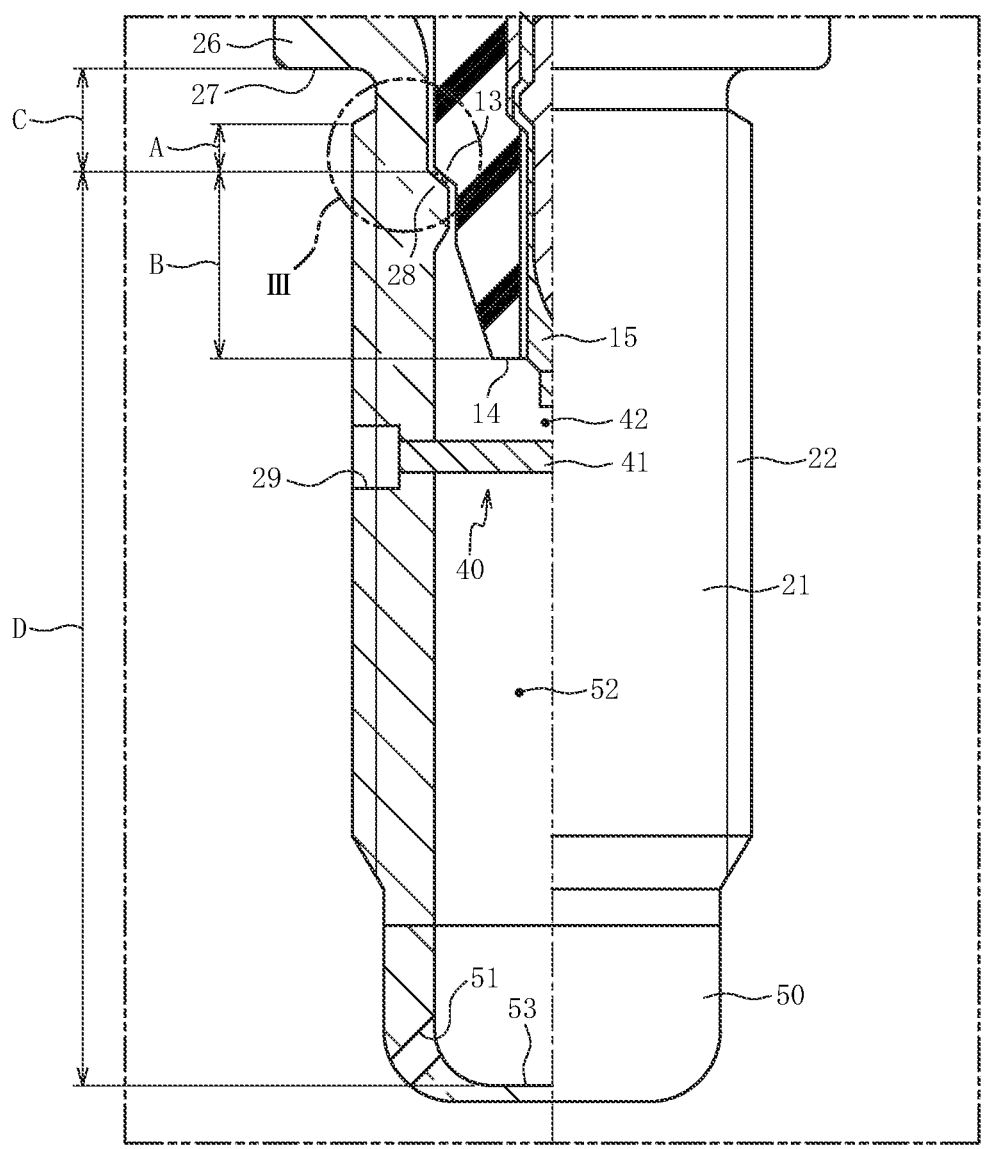
FIG. 2 Enlarged half-sectional view of the spark plug at a part indicated by II in FIG. 1.
Figure 3:
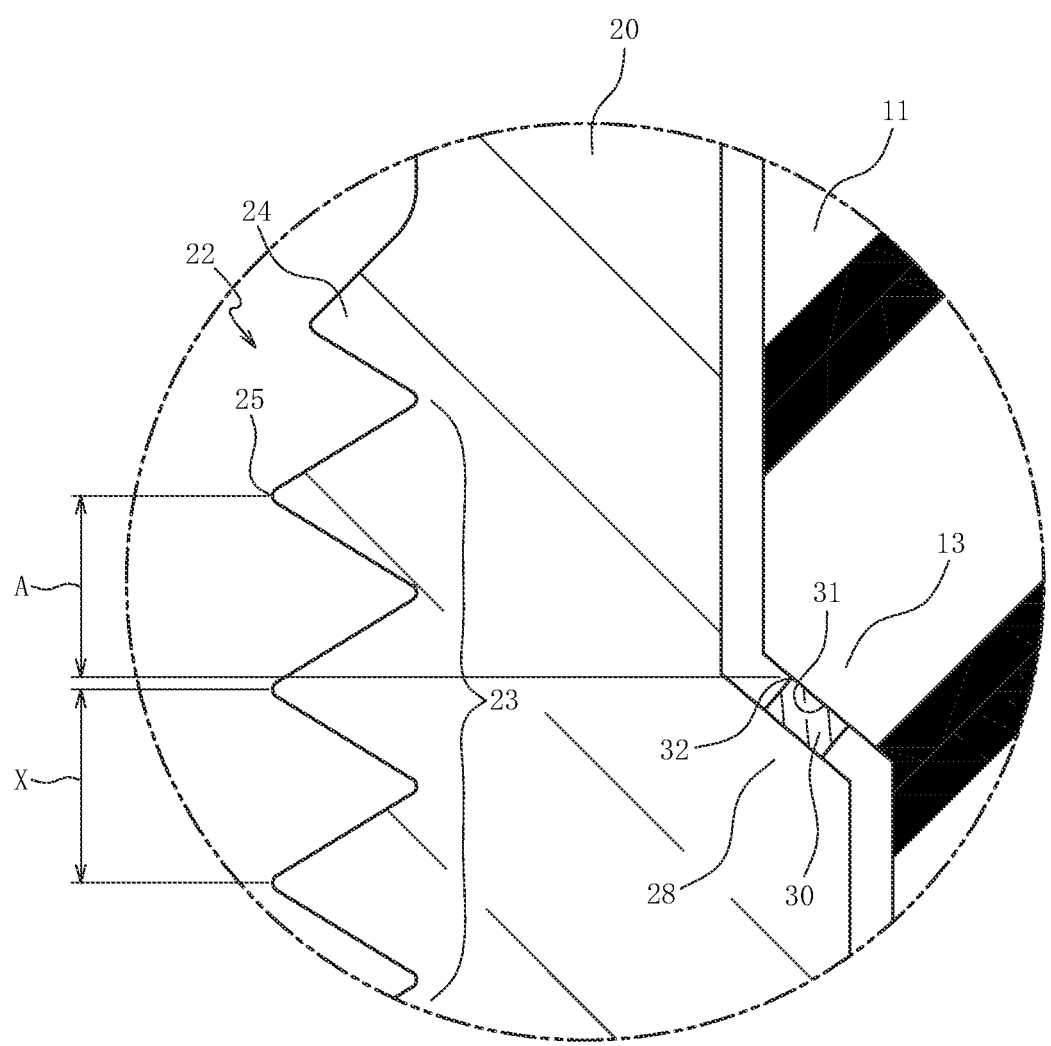
FIG. 3 Enlarged sectional view of the spark plug at a part indicated by III in FIG. 2.

Hereinafter, preferred embodiments of the present invention will be described with reference to the accompanying drawings. FIG. 1 is a half-sectional view of a spark plug 10 according to an embodiment, with an axial line O as a boundary. FIG. 2 is an enlarged half-sectional view of the spark plug 10 at a part indicated by II in FIG. 1, with the axial line O as a boundary. FIG. 3 is an enlarged sectional view including the axial line O of the spark plug 10 at a part indicated by III in FIG. 2. In FIG. 1 to FIG. 3, the lower side on the drawing sheet is referred to as a front side of the spark plug 10, and the upper side on the drawing sheet is referred to as a rear side of the spark plug 10. As shown in FIG. 1, the spark plug 10 includes an insulator 11, a center electrode 15, a metal shell 20, a ground electrode 40, and a cap portion 50.

The insulator 11 is a substantially cylindrical member having an axial hole 12 formed along the axial line O, and is made of ceramic such as alumina which is excellent in mechanical property and in insulation property under high temperature. The insulator 11 has, on the outer circumference thereof, a step portion 13 (see FIG. 2) protruding radially outward. The step portion 13 has a surface facing the front side.

A center electrode 15 is provided on the front side of the axial hole 12 of the insulator 11. The center electrode 15 protrudes to the front side with respect to a front end 14 (see FIG. 2) of the insulator 11. The center electrode 15 is electrically connected to a metal terminal 16 in the axial hole 12. The metal terminal 16 is a bar-shaped member to which a high-voltage cable (not shown) is connected, and is made of a conductive metal material (e.g., low-carbon steel). The metal terminal 16 is fixed to a rear end of the insulator 11.

The metal shell 20 is a substantially cylindrical member made of a conductive metal material (e.g., low-carbon steel). The metal shell 20 is provided around the outer circumference of the insulator 11. A front end portion 21 of the metal shell 20 has an external thread 22 on the outer circumference thereof. The spark plug 10 is attached to an engine (not shown) by the external thread 22 of the metal shell 20 being screwed into a screw hole of the engine. The external thread 22 (see FIG. 3) includes a full thread portion 23 and a halfway thread portion 24.

The metal shell 20 has a flange portion 26 on the rear side of the external thread 22. The flange portion 26 has a seating surface 27 to be subjected to the axial tension of the external thread 22. In the present embodiment, the seating surface 27 is an annular surface substantially perpendicular to the axial line O. A gasket (not shown) for improving airtightness between the engine and the seating surface 27 is provided between the external thread 22 and the flange portion 26.

The metal shell 20 has, on the inner circumference of the front end portion 21, a ledge portion 28 protruding radially inward. The ledge portion 28 has a surface facing the rear side. In the present embodiment, the metal shell 20 has a hole 29 penetrating the front end portion 21 in the radial direction. The hole 29 is located on the front side with respect to the ledge portion 28. Ridges and grooves of the external thread 22 are removed at the hole 29.

The ledge portion 28 of the metal shell 20 is located on the front side with respect to the step portion 13 of the insulator 11. A packing 30 (see FIG. 3) is interposed between the ledge portion 28 and the step portion 13. The packing 30 is an annular plate member made of a metal material such as iron or steel softer than the metal material forming the metal shell 20. The ledge portion 28 engages with the step portion 13 via the packing 30. The packing 30 closely contacts with the step portion 13, to form a contact portion 31 where the packing 30 contacts with the step portion 13.

The ground electrode 40 is a bar-shaped member made of a metal material containing Pt, etc. as a main component. In the present embodiment, the ground electrode 40 is press-fitted into the hole 29 formed in the metal shell 20, and penetrates the front end portion 21 so as to protrude inward of the front end portion 21. An end 41 of the ground electrode 40 (see FIG. 2) is opposed to the center electrode 15 with the spark gap 42 therebetween. The main component element of the ground electrode 40 is not limited to Pt, and as a matter of course, another element may be used as a main component. Examples of other elements include Ni and Ir.

To the front end portion 21 of the metal shell 20, a cap portion 50 is connected on the front side of the external thread 22. A sub chamber 52 is formed by being surrounded by the metal shell 20 and the cap portion 50. When the spark plug 10 is attached to the engine (not shown), the cap portion 50 is exposed to the combustion chamber of the engine. The cap portion 50 is made of a metal material containing Fe, etc. as a main component. The main component element of the cap portion 50 is not limited thereto, and as a matter of course, another element may be used as a main component. Examples of other elements include Ni and Cu.

The cap portion 50 covers the center electrode 15 and the end 41 of the ground electrode 40 from the front side. In the present embodiment, the cap portion 50 is welded to the metal shell 20. The cap portion 50 has a through hole 51. The sub chamber 52 and the combustion chamber communicate with each other through the through hole 51.

In the spark plug 10 attached to the engine (not shown), by a valve operation of the engine, a combustible air-fuel mixture flows from the combustion chamber of the engine through the through hole 51 into the sub chamber 52 on the inner side of the cap portion 50. The spark plug 10 generates a flame kernel in the spark gap 42 by discharge between the center electrode 15 and the ground electrode 40. When the flame kernel grows, the combustible air-fuel mixture in the sub chamber 52 is ignited and thus the combustible air-fuel mixture is combusted. By an expansion pressure caused by the combustion, the spark plug 10 jets the gas flow including the flame, from the through hole 51 into the combustion chamber. By the jet flow of the flame, the combustible air-fuel mixture in the combustion chamber is combusted.

In the spark plug 10, the sub chamber 52 is formed by the cap portion 50 closing the front end portion 21 of the metal shell 20, and therefore there is a risk that pre-ignition occurs in the sub chamber 52. In particular, there is a concern that the insulator 11 exposed in the sub chamber 52 might be excessively heated. Accordingly, in order to inhibit pre-ignition in the sub chamber 52, the spark plug 10 is manufactured so as to satisfy the following conditions.

In the external thread 22 (see FIG. 3), an axial-line-direction distance A (mm) between a crest 25 of a rear-end ridge of the full thread portion 23 and a rear end 32 of the contact portion 31, and a pitch X (mm) of the external thread 22, satisfy a relationship of 0<A<4X. In the present embodiment, the rear end 32 of the contact portion 31 is located on the front side with respect to the crest 25 of the ridge. The contact portion 31 serves as a path of heat conduction from the insulator 11 to the metal shell 20. The external thread 22 serves as a path of heat conduction from the metal shell 20 to the engine. In a part to 4× from the crest 25 of the ridge, the axial tension of the external thread 22 is particularly great. On the radially inner side of this part, the rear end 32 of the contact portion 31 is located. Therefore, by heat conduction, heat of the insulator 11 is readily released to the engine through the contact portion 31 and the external thread 22.

Of the insulator 11, a part on the front side with respect to the contact portion 31 is located in the sub chamber 52. An axial-line-direction distance B between the rear end 32 of the contact portion 31 and the front end 14 of the insulator 11 is 15 mm or less, and preferably 12 mm or less. Thus, the surface area of the insulator 11 present in the sub chamber 52 can be made small. The smaller the surface area of the insulator 11 is, the less the insulator 11 receives heat of the sub chamber 52. Therefore, excessive heating of the insulator 11 can be inhibited. Preferably, the distance B is 2 mm or greater, in order to prevent occurrence of discharge between the ledge portion 28 and the center electrode 15.

The seating surface 27 serves as a path of heat conduction from the metal shell 20 to the engine. In the present embodiment, the seating surface 27 is located on the rear side with respect to the rear end 32 of the contact portion 31. An axial-line-direction distance C between the rear end 32 of the contact portion 31 and the seating surface 27 is 3.6 mm or less. Thus, by heat conduction, heat of the insulator 11 is readily released to the engine through the contact portion 31 and the seating surface 27. Preferably, the distance C is 1.5 mm or greater, in order to place the rear end 32 of the contact portion 31 on the radially inner side of the external thread 22.

Since the spark plug 10 satisfies the relationships of 0<A<4X, B≤15 mm, and C≤3.6 mm, heat of the insulator 11 is readily released to the engine through the metal shell 20. Thus, pre-ignition due to excessive heating of the insulator 11 can be inhibited.

In the spark plug 10, an axial-line-direction distance D (mm) between a front end 53 of the sub chamber 52 and the rear end 32 of the contact portion 31 is not less than the distance C. When the relationship of C≤D is satisfied, temperature increase of the contact portion 31 is inhibited. Thus, heat of the insulator 11 is further readily released to the engine through the metal shell 20, so that pre-ignition can be further inhibited. It is preferable to satisfy 1.5C≤D, because the effect is exhibited more significantly.

EXAMPLES

The present invention will be described in more detail with reference to examples, while the present invention is not limited to the examples.

Samples Nos. 1 to 10 of various spark plugs 10 different in the distances A, B, C, D were manufactured. The pitch X of the external thread 22 of each sample was 1.25 mm. Each sample is mounted to a naturally-aspirated engine of in-line 4-cylinder and 1.3 liters, and the engine was operated with a condition of 6000 rpm and wide open throttle (WOT). Under this condition, the engine was operated during one minute with a fixed ignition timing, and if pre-ignition had not occurred during this period, the ignition timing was advanced by an angle of 2°. Such an operation was repeated. Thus, the ignition timing at which pre-ignition occurred, i.e., an operation angle of the crankshaft with respect to the top dead center, was measured.

Table 1 shows the distances A, B, C, D, and the operation angle)(° before the top dead center, at which pre-ignition occurred, for samples Nos. 1 to 10. Table 1 also shows a value (4X) that is 4 times the pitch X of the external thread 22 and a value (1.5C) that is 1.5 times the distance C.

TABLE 1

| No | A (mm) | B (mm) | C (mm) | D (mm) | 4X (mm) | 1.5C (mm) | Operation Angle (°) |
|---|---|---|---|---|---|---|---|
| 1 | 1.4 | 2 | 3.2 | 28.3 | 5.0 | 4.8 | 55 |
| 2 | 1.4 | 6 | 3.2 | 28.3 | 5.0 | 4.8 | 45 |
| 3 | 1.4 | 6 | 3.2 | 34.3 | 5.0 | 4.8 | 35 |
| 4 | 1.4 | 2 | 3.2 | 4.5 | 5.0 | 4.8 | 25 |
| 5 | 1.4 | 15 | 3.2 | 28.3 | 5.0 | 4.8 | 15 |
| 6 | 1.4 | 15 | 3.2 | 34.3 | 5.0 | 4.8 | 15 |
| 7 | 1.4 | 2 | 3.2 | 3.0 | 5.0 | 4.8 | 5 |
| 8 | 10.4 | 15 | 12.2 | 25.3 | 5.0 | 18.3 | −5 |
| 9 | 6.4 | 6 | 3.2 | 34.3 | 5.0 | 4.8 | −5 |
| 10 | 1.4 | 18 | 3.2 | 28.3 | 5.0 | 4.8 | −15 |

As shown in Table 1, in samples Nos. 8 to 10, pre-ignition occurred before advance to an angle before the top dead center. It is inferred that, in sample No. 8, since the distance A is not less than 4X and the distance C is greater than 3.6 mm, heat conduction from the insulator 11 to the metal shell 20 was poor and thus occurrence of pre-ignition could not be inhibited. It is inferred that, in sample No. 9, since the distance A is not less than 4X and the distance B is greater than 15 mm, heat conduction from the insulator 11 to the metal shell 20 was poor and thus occurrence of pre-ignition could not be inhibited, as in No. 8.

In contrast, in samples Nos. 1 to 7, the angle could be advanced to an angle before the top dead center. It is inferred that, in samples Nos. 1 to 7, since the relationships of 0 mm<A<4X (mm), B≤15 mm, and C≤3.6 mm were satisfied, pre-ignition due to excessive heating of the insulator 11 could be inhibited by heat conduction from the insulator 11 to the metal shell 20.

In particular, in samples Nos. 1 to 6, the ignition timing could be set to 10° or greater before the top dead center. It is inferred that, in samples Nos. 1 to 6, since the relationships of 0 mm<A<4X (mm), B≤15 mm, and C≤3.6 mm were satisfied and further the relationship of C≤D was satisfied, heat conduction from the insulator 11 to the metal shell 20 could be further improved.

In samples Nos. 1 to 4, the ignition timing could be set to 20° or greater before the top dead center. It is inferred that, in samples Nos. 1 to 4, since the relationships of 0 mm<A<4X (mm), B≤12 mm, C≤3.6 mm, and C≤D were satisfied, heat conduction from the insulator 11 to the metal shell 20 could be further improved.

In particular, in samples Nos. 1 to 3, the ignition timing could be set to 30° or greater before the top dead center. It is inferred that, in samples Nos. 1 to 3, since the relationships of 0 mm<A<4X (mm), B≤12 mm, C≤3.6 mm, and 1.5C≤D were satisfied, heat conduction from the insulator 11 to the metal shell 20 could be further improved.

While the present invention has been described above with reference to the embodiment, the present invention is not limited to the above embodiment at all. It can be easily understood that various modifications can be devised without departing from the gist of the present invention. For example, the shape of the cap portion 50, the number, the shape, and the size of the through hole 51, the shape of the sub chamber 52, and the like may be set as appropriate.

The above embodiment has shown the case where the packing 30 (other member) is interposed between the ledge portion 28 of the metal shell 20 and the step portion 13 of the insulator 11. However, the present invention is not necessarily limited thereto. As a matter of course, without providing the packing 30, the ledge portion 28 of the metal shell 20 may directly contact with the step portion 13 of the insulator 11, to form the contact portion 31 where the ledge portion 28 of the metal shell 20 contacts with the step portion 13 of the insulator 11. Also in this case, heat is transferred from the contact portion 31 of the insulator 11 to the ledge portion 28 of the metal shell 20, and thus the same effects as in the above embodiment are obtained.

The above embodiment has shown the case where the gasket (not shown) is interposed between the external thread 22 and the flange portion 26. However, the present invention is not necessarily limited thereto. As a matter of course, the seating surface 27 of the flange portion 26 may be formed to be a taper surface, to make the spark plug 10 of a so-called taper sheet type without a gasket. Also in this case, heat is transferred from the seating surface of the metal shell 20 to the engine, and thus the same effects as in the above embodiment are obtained.

The above embodiment has shown the case where the ground electrode 40 penetrating the front end portion 21 of the metal shell 20 is provided at the position of the external thread 22. However, the present invention is not necessarily limited thereto. For example, as a matter of course, the cap portion may be provided such that the front end surface of the front end portion 21 of the metal shell 20 is exposed, and the ground electrode may be connected to the front end surface of the front end portion 21. The shape of the ground electrode may be a straight shape or a bent shape. The ground electrode may be joined to the cap portion.

The above embodiment has shown the case where the end 41 of the ground electrode 40 is located on the front side of the center electrode 15, and the spark gap 42 is formed on the front side of the center electrode 15. However, the present invention is not necessarily limited thereto. For example, as a matter of course, the end 41 of the ground electrode 40 may be located away from the side surface of the center electrode 15 and the spark gap 42 may be formed between the side surface of the center electrode 15 and the end 41 of the ground electrode 40. In addition, as a matter of course, a plurality of ground electrodes 40 may be arranged so as to provide a plurality of spark gaps 42.

DESCRIPTION OF REFERENCE NUMERALS

10: spark plug
11: insulator
12: axial hole
13: step portion
14: front end of insulator
15: center electrode
20: metal shell
22: external thread
23: full thread portion
25: crest of rear-end ridge of full thread portion
26: flange portion
27: seating surface
28: ledge portion
30: packing (other member)
31: contact portion
32: rear end of contact portion
40: ground electrode
41: end of ground electrode
42: spark gap
50: cap portion
51: through hole
52: sub chamber
53: front end of sub chamber
O: axial line

The invention claimed is:

1. A spark plug comprising:
a cylindrical insulator in which an axial hole extending along an axial line is formed, the insulator having a step portion protruding radially outward on an outer circumference thereof;
a center electrode provided in the axial hole;
a cylindrical metal shell having a ledge portion protruding radially inward on an inner circumference thereof, an external thread formed on an outer circumference thereof, and a flange portion including a seating surface located on a rear side of the external thread, the metal shell being provided around an outer circumference of the insulator, the ledge portion engaging with the step portion from a front side directly or via another member, so as to form a contact portion where the ledge portion or the other member contacts with the step portion;
a ground electrode electrically connected to the metal shell and forming a spark gap between the center electrode and an end of the ground electrode; and
a cap portion provided on a front side of the metal shell so as to cover the center electrode and the end of the ground electrode from the front side, the cap portion having a through hole, wherein
in a cross section including the axial line, where
a pitch of the external thread is X (mm),
an axial-line-direction distance between a crest of a rear-end ridge of a full thread portion of the external thread and a rear end of the contact portion is A (mm),
an axial-line-direction distance between the rear end of the contact portion and a front end of the insulator is B (mm), and
an axial-line-direction distance between the rear end of the contact portion and the seating surface is C (mm),
$0 < A < 4X$, $B \leq 15$, and $C \leq 3.6$ are satisfied.

2. The spark plug according to claim 1, wherein
in the cross section including the axial line, where an axial-line-direction distance between a front end of a sub chamber formed by the cap portion and the rear end of the contact portion is D (mm), $C \leq D$ is satisfied.

3. The spark plug according to claim 2, wherein $1.5C \leq D$ is satisfied.

4. The spark plug according to claim 1, wherein $B \leq 12$ is satisfied.

* * * * *